United States Patent

Iida et al.

[11] Patent Number: 6,080,376
[45] Date of Patent: *Jun. 27, 2000

[54] METHODS OF DENITRATING EXHAUST GASES

[75] Inventors: Kouzo Iida; Shigeru Nojima; Yoshiaki Obayashi, all of Hiroshima; Norihisa Kobayashi, Tokyo; Satoru Serizawa, Nagasaki, all of Japan

[73] Assignee: Mitsubishi Jukogyo Kabushiki Kaisha, Tokyo, Japan

[*] Notice: This patent is subject to a terminal disclaimer.

[21] Appl. No.: 08/988,116

[22] Filed: Dec. 10, 1997

Related U.S. Application Data

[62] Division of application No. 08/508,174, Jul. 27, 1995, Pat. No. 5,728,356.

[30] Foreign Application Priority Data

Jul. 28, 1994 [JP] Japan ................................. 6-176494
Oct. 3, 1994 [JP] Japan ................................. 6-238892

[51] Int. Cl.[7] ............................................... C01B 21/00
[52] U.S. Cl. ................................. 423/239.1; 423/239.2; 423/237
[58] Field of Search ............................... 423/237, 239.1, 423/239.2

[56] References Cited

U.S. PATENT DOCUMENTS 3,702,886  11/1972  Argauer et al. .................. 423/328
5,728,356  3/1998  Iida et al. ........................ 423/239.1

FOREIGN PATENT DOCUMENTS 0 299 294  1/1989  European Pat. Off. .
6-182152   7/1994  Japan .

*Primary Examiner*—Tom Dunn
*Attorney, Agent, or Firm*—Eugene Lieberstein; Michael N. Meller

[57] ABSTRACT

A method of denitrating an exhaust gas by means of removing nitrogen oxides catalytically using ammonia as a reducing agent while introducing an exhaust gas containing the nitrogen oxides into a reaction vessel packed with a catalyst, comprising:

providing a denitration catalyst layer in the upstream of the gas flow, an ammonia decomposition catalyst layer capable of decomposing oxidatively ammonia into nitrogen and nitrogen oxides in the downstream and a second denitration catalyst layer or a denitration catalyst layer capable of decomposing ammonia in the further downstream; and, adding ammonia in an amount not less than the reaction equivalence for the nitrogen oxides in the exhaust gas to the inlet of the first denitration catalyst layer.

4 Claims, 1 Drawing Sheet

METHODS OF DENITRATING EXHAUST GASES

This is a divisional application of U.S. Ser. No. 08/508,174 filed Jul. 27, 1996 now U.S. Pat. No. 5,728,356.

FIELD AND BACKGROUND OF THE INVENTION

The present invention relates to a method of denitrating an exhaust gas by which nitrogen oxides (NOx) in the exhaust gas can be eliminated at a high efficiency.

DESCRIPTION OF RELATED ART

As a method of eliminating NOx contained in a burning exhaust gas, a selective catalytic hydrogenation using $NH_3$ as a reducing agent is of wide use majorly in thermal-power stations. As a catalyst, a titanium oxide-based catalyst having vanadium, tungsten or molybdenum as an active component is mainly employed.

Control of NOx emission becomes strict more and more in these days, and a higher efficiency of denitration is required in suburban thermal-power stations along with the enlargement of generating facilities in response to the increase in demand of electricity power.

A conventional denitration method employs $NH_3$ as a reducing agent, and decomposes NOx into $N_2$ on the catalyst according to the formula shown below.

$$4NO+4NH_3+O_2 \rightarrow 4N_2+6H_2O$$

Based on this formula, it is possible theoretically that 100% elimination of NOx is conducted by adding $NH_3$ in the molar amount equal to that of NOx. However, it is not practical to effect completely uniform mixing of $NH_3$ and NOx in the exhaust gas, and $NH_3$ should be added in excess of NOx for the purpose of highly efficient denitration. Accordingly, disadvantage has been experienced that unreacted $NH_3$ is emitted in a significant amount.

SUMMARY OF THE INVENTION

According to the present invention, highly efficient denitration can be conducted while reducing the emission of unreacted $NH_3$ into atmosphere to a level as low as possible.

Thus, the present invention provides a first method of denitrating an exhaust gas by means of removing nitrogen oxides catalytically using ammonia as a reducing agent while introducing an exhaust gas containing the nitrogen oxides into a reaction vessel packed with a catalyst, comprising:

providing a first denitration catalyst layer in the upstream of the gas flow, an ammonia decomposition catalyst layer containing an ammonia decomposition catalyst capable of decomposing oxidatively ammonia into nitrogen and nitrogen oxides in the downstream and a second denitration catalyst layer in the further downstream; and, adding ammonia in an amount not less than the reaction equivalence for the nitrogen oxides in the exhaust gas to the inlet of the first denitration catalyst layer.

In the first denitration method described above in the present invention, the ammonia decomposition catalyst may be a catalyst having a performance of 70% or higher as % nitrogen selection defined as follows:

% nitrogen selection=[1−{(NOx (ppm) at outlet of ammonia decomposition catalyst−NOx (ppm) at inlet of ammonia decomposition catalyst)/(NH$_3$ (ppm) at inlet of ammonia decomposition catalyst−NH$_3$ (ppm) at outlet of ammonia decomposition catalyst)}].

Furthermore, an objective of the present invention is to provide a 2nd method of denitrating an exhaust gas by means of removing nitrogen oxides catalytically using ammonia as a reducing agent while introducing an exhaust gas containing the nitrogen oxides into a reaction vessel packed with a catalyst, comprising:

providing a denitration catalyst layer in the upstream of the gas flow, an ammonia decomposition catalyst layer containing an ammonia decomposition catalyst capable of decomposing oxidatively ammonia into nitrogen and nitrogen oxides in the downstream and a denitration catalyst layer capable of decomposing ammonia in the further downstream; and, adding ammonia in an amount not less than the reaction equivalence for the nitrogen oxides in the exhaust gas whereby removing the nitrogen oxides contained in said exhaust gas.

Furthermore, in the first or second denitration method described above, the ammonia decomposition catalyst may be a catalyst having a crystalline silicate which is represented by the formula as dehydrated:

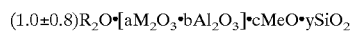

wherein R denotes an alkaline metal ion and/or hydrogen ion, M denotes at least one element selected from the group consisting of VIII group elements, rare earth elements, titanium, vanadium, chromium, niobium, antimony and gallium, Me denotes an alkaline earth metal, a+b=1, a≧0, b≧0, c≧0, y/c>12 and y>12, and which has a X-ray diffraction pattern shown in Table 1 in the specification as a carrier and at least one metal selected from the group consisting of platinum, palladium, ruthenium, iridium, and rhodium as an active metal.

TABLE 1

| Lattice spacing (interstitial distance) (d value) | Relative strength |
|---|---|
| 11.2 ± 0.3 | VS |
| 10.0 ± 0.3 | VS |
| 6.7 ± 0.2 | W |
| 6.4 ± 0.2 | M |
| 6.0 ± 0.2 | M |
| 5.7 ± 0.2 | W |
| 5.6 ± 0.2 | M |
| 4.6 ± 0.1 | W |
| 4.25 ± 0.1 | M |
| 3.85 ± 0.1 | VS |
| 3.75 ± 0.1 | S |
| 3.65 ± 0.1 | S |
| 3.3 ± 0.1 | M |
| 3.05 ± 0.1 | W |
| 3.0 ± 0.1 | M |

VS: Very strong
S: Strong
M: Medium
W: Weak
(X-ray source: Cu)

BRIEF DESCRIPTION OF THE DRAWINGS

The invention will now be described with reference to the drawings in which.

DESCRIPTION OF THE PREFERRED EMBODIMENTS

Figure 1:
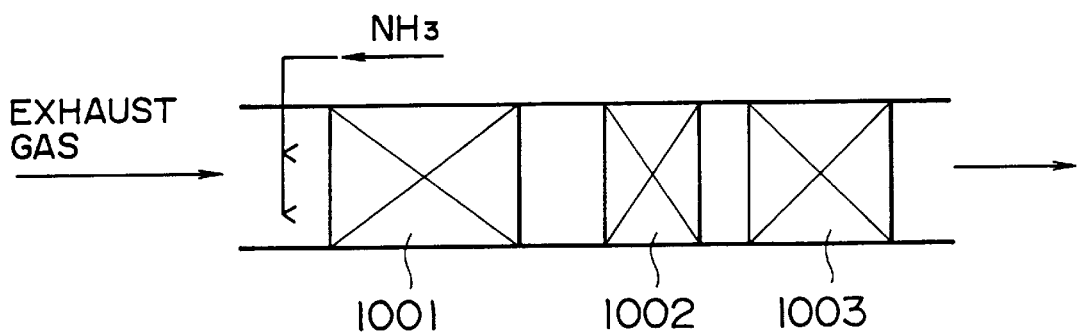
FIG. 1 shows a schematic view illustrating a first method (system) of denitrating an exhaust gas according to the present invention; and, FIG. 2 shows a schematic view illustrating a second method (system) of denitrating an exhaust gas according to the present invention.

An embodiment of the first denitration method according to the present invention is described with referring to FIG. 1. First denitration catalyst layer 1001 is provided in the furthermost upstream of the gas flow, and $NH_3$ decomposition catalyst layer 1002 is provided in the downstream, and then second denitration catalyst layer 1003 is provided in the further downstream, and $NH_3$ in an amount not less than the reaction equivalence for the NOx in the exhaust gas is added to the inlet of the first denitration catalyst layer 1001, whereby accomplish 90% or more of the denitration reaction in the first denitration catalyst layer 1001. Unreacted $NH_3$ coming from first denitration catalyst layer 1001 is decomposed by $NH_3$ decomposition catalyst layer 1002 to adjust the concentrations of NOx and $NH_3$ at the inlet of second denitration catalyst layer 1003 located in the downstream, whereby reducing the concentrations of NOx and $NH_3$ at the outlet of second denitration catalyst layer 1003 to the levels not exceeding 0.1 ppm and 3 ppm, respectively. First and second denitration catalyst layers 1001 and 1003 provided in the upstream and downstream, respectively, may employ conventional $TiO_2$-based catalysts containing V, W or Mo as an active component.

In the embodiment of the present invention described above, it is preferable that the catalyst employed in $NH_3$ decomposition catalyst layer 1002 has a % nitrogen selection as defined below not less than 70%.

% nitrogen selection=[1−{(NOx (ppm) at outlet of ammonia decomposition catalyst−NOx (ppm) at inlet of ammonia decomposition catalyst)/($NH_3$ (ppm) at inlet of ammonia decomposition catalyst−$NH_3$ (ppm) at outlet of ammonia decomposition catalyst)}].

Thus, since a small % nitrogen selection of the ammonia decomposition catalyst as defined above leads to a small range of the operation of the facility for achieving 0 <$NH_3$ (ppm)−NOx (ppm)<3 (ppm) at the outlet of ammonia decomposition catalyst layer, it is required to control the facility with a wide range of gas treatment and temperature. Accordingly, % nitrogen selection is preferably 70% or higher.

As a $NH_3$ decomposition catalyst having the % nitrogen selection specified above, a catalyst having a crystalline silicate which is represented by the formula as dehydrated:

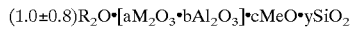

wherein R denotes an alkaline metal ion and/or hydrogen ion, M denotes at least one element selected from the group consisting of VIII group elements, rare earth elements, titanium, vanadium, chromium, niobium, antimony and gallium, Me denotes an alkaline earth metal, a+b=1, a≧0, b≧0, c≧0, y/c>12 and y>12, and which has a X-ray diffraction pattern shown in Table 1 shown above as a carrier and at least one metal selected from the group consisting of platinum, palladium, ruthenium, iridium, and rhodium as an active metal is preferable.

The exhaust gas which has been denitrated by supplying an excessive amount of $NH_3$ in first denitration catalyst layer 1001 now has the composition of NOx:0 to 10 ppm and $NH_3$:10 to 30 ppm, and then is introduced into the above-mentioned $NH_3$ decomposition catalyst layer whereby reducing the amount of $NH_3$ to achieve the condition "0<$NH_3$ (ppm)−NOx (ppm)<3 (ppm)" at the outlet of $NH_3$ decomposition catalyst layer 1002, and the exhaust gas having this composition is then denitrated in second denitration catalyst layer 1003 to achieve the concentrations of NOx and $NH_3$ not exceeding 0.1 ppm and 3 ppm, respectively.

Contrary to this, a conventional method wherein NOx in an exhaust gas is denitrated by using only a denitration catalyst layer while adding an excessive amount of $NH_3$ to achieve a concentration of NOx in the exhaust gas not exceeding 0.1 ppm can not avoid a content of $NH_3$ in the exhaust gas which is at least 10 ppm.

Example 1 described below was conducted in relation with the first denitration method referring to FIG. 1.

EXAMPLE 1

(Preparation of denitration catalyst)

A powder catalyst consisting of 4% by weight of vanadium pentaoxide ($V_2O_5$) and 8% by weight of tungsten trioxide ($WO_3$) on titanic ($T_iO_2$) was molded into a lattice honeycomb having the pitch of 3.3 mm and the wall thickness of 0.5 mm, which was used as a denitration catalyst.

(Preparation of $NH_3$ decomposition catalyst)

5616 g of water glass #1 ($SiO_2$: 30%) was dissolved in 5429 g of water to yield solution A. Separately, 718.9 g of aluminum sulfate, 110 g of ferric chloride, 47.2 g of calcium acetate, 262 g of sodium chloride and 2020 g of concentrated hydrochloric acid were dissolved together in 4175 g of water to yield solution B. Solution A and solution B were fed in a constant ratio to form a precipitate, and the mixture was stirred thoroughly to yield a slurry at pH 8.0. The slurry thus obtained was charged in a 20 L autoclave, to which 500 g of tetrapropyl ammonium bromide was added and the mixture was subjected to hydrothermal synthesis at 160° C. for 72 hours. After synthesis, washing with water, drying and sintering for 3 hours at 500° C, crystalline silicate 1 was obtained. Crystalline silicate 1 thus obtained is represented in a molar ratio (excluding crystal water) by the formula shown below and has the crystal structure by X-day diffraction pattern in Table 1 shown above.

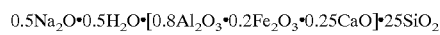

Crystalline silicate 1 obtained above was subjected to $NH_4$ ion exchange by stirring with 4N aqueous solution of $NH_4Cl$ at 40° C. for 3 hours. After the ion exchange, the silicate was washed and dried at 100° C. for 24 hours and sintered at 400° C. for 3 hours to obtain crystalline silicate 1 of type H. Crystalline silicate of type H is of the type which has protons on its surface.

Crystalline silicate 1 of type H thus obtained was impregnated with each of the aqueous solutions of chloroplatinic acid, palladium nitrate, ruthenium chloride and iridium chloride, evaporated to dryness and sintered at 500° C. for 3 hours to obtain a powder catalyst. To 100 g of the powder obtained, 3 g of alumina sol and 55 g of silica sol ($SiO_2$: 20% by weight) as binders and 200 g of water were added to obtain a slurry, which was wash-coated to a monolith support for coagulate (30-cells/square inch in a form of lattice) at the coating rate of 200 g/m². The catalysts thus obtained were designated as $NH_3$ decomposition catalysts 1 to 5. The characteristics of the catalysts are shown in Table 2 below.

TABLE 2

| NH₃ decomposition catalyst No. | Active metal (amount supported: wt %) | |
| --- | --- | --- |
| 1 | Pt | (0.02) |
| 2 | Pd | (1) |
| 3 | Ru | (0.3) |
| 4 | Ir | (0.5) |

Crystalline silicates 2 to 8 of type H were prepared similarly in the method of preparation of $NH_3$ decomposition catalysts described above except for using 112 g of cobalt chloride, 105 g of titanium chloride, 10 g of vanadium chloride, 107 g of chromium chloride, 135 g of niobium chloride, 155 g of antimony chloride and 119 g of gallium chloride instead of ferric chloride. Using these crystalline silicates of type H and the aqueous solution of chloroplatinic acid, platinum was supported on each crystalline silicate of type H and wash-coated to a monolith support for coagulate similarly as described above at the coating rate of 200 g/m² of support surface. The catalysts thus obtained were designated as $NH_3$ decomposition catalysts 6 to 11. The characteristics of the catalysts are shown in Table 3 below.

TABLE 3

| NH₃ decomposition catalyst No. | Active metal (amount supported: wt %) |
| --- | --- |
| 5 | Pt (0.02) |
| 6 | Pt (0.02) |
| 7 | Pt (0.02) |
| 8 | Pt (0.02) |
| 9 | Pt (0.02) |
| 10 | Pt (0.02) |
| 11 | Pt (0.02) |

(Denitration reaction test: Test No.1)

Three denitration catalysts having the size of 40 mm×50 mm×400 mmL, 1 $NH_3$ decomposition catalyst having the size of 42 mm×50 mm×500 mmL and 2 denitration catalysts, all described above, were attached serially and tested in the condition described below.

TABLE 4

| Concentration of NOx in exhaust gas | 50 ppm |
| --- | --- |
| Concentration of NH₃ supplied | 60 ppm, 70 ppm |
| Concentration of O₂ in exhaust gas | 14.7% |
| Gas flow rate | 22 Nm³/hour |
| Gas temperature | 360° C. |

The results are shown in Table 5. At the outlet of the upstream first denitration catalyst layer which corresponds to a conventional denitration method, NOx was reduced to 0.02 to 0.03 ppm which indicated a high denitration efficiency, but $NH_3$ was emitted at a level as high as 10 to 20 ppm. In contrast, the method according to the present invention provided the levels of NOx and $NH_3$ at the outlet of the downstream second denitration catalyst layer as low as 0.02 to 0.1 ppm and less than 3 ppm, respectively, ensuring the low level of emission of both of NOx and $NH_3$.

TABLE 5

| NH₃ decomposition catalyst No. | Inlet NH₃ (ppm) | First denitration catalyst layer outlet | | Second denitration catalyst layer outlet | |
| --- | --- | --- | --- | --- | --- |
| | | NOx (ppm) | NH₃ (ppm) | NOx (ppm) | NH₃ (ppm) |
| 1 | 60 | 0.02 | 10.1 | 0.02 | 0.4 |
| | 70 | 0.02 | 19.8 | 0.02 | 1.0 |
| 2 | 60 | 0.02 | 10.2 | 0.03 | 1.5 |
| | 70 | 0.02 | 20.0 | 0.05 | 2.3 |
| 3 | 60 | 0.02 | 10.1 | 0.1 | 1.0 |
| | 70 | 0.02 | 19.7 | 0.07 | 2.2 |
| 4 | 60 | 0.02 | 9.9 | 0.03 | 1.0 |
| | 70 | 0.02 | 20.1 | 0.02 | 1.8 |
| 5 | 60 | 0.02 | 10.0 | 0.05 | 2.0 |
| | 70 | 0.02 | 20.1 | 0.07 | 2.6 |
| 6 | 60 | 0.02 | 10.1 | 0.02 | 1.5 |
| | 70 | 0.02 | 19.9 | 0.03 | 2.4 |
| 7 | 60 | 0.02 | 9.9 | 0.02 | 2.2 |
| | 70 | 0.02 | 20.2 | 0.02 | 2.9 |
| 8 | 60 | 0.02 | 10.2 | 0.03 | 1.3 |
| | 70 | 0.02 | 19.8 | 0.03 | 2.0 |
| 9 | 60 | 0.02 | 10.0 | 0.05 | 1.2 |
| | 70 | 0.02 | 20.0 | 0.04 | 2.1 |
| 10 | 60 | 0.02 | 10.2 | 0.03 | 1.6 |
| | 70 | 0.02 | 20.1 | 0.04 | 2.3 |
| 11 | 60 | 0.02 | 10.2 | 0.1 | 2.0 |
| | 70 | 0.02 | 19.9 | 0.06 | 2.8 |

Figure 2:
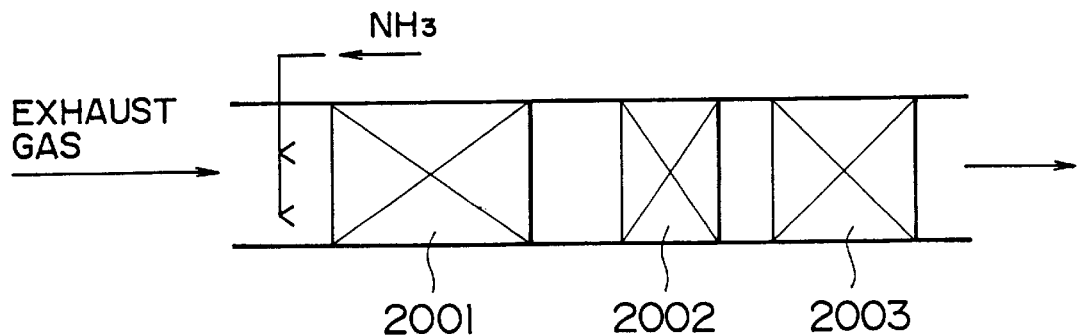

An embodiment of the second denitration method according to the present invention is described with referring to FIG. 2. As shown in FIG. 2, first denitration catalyst layer 2001 is provided in the furthermost upstream of the gas flow, and $NH_3$ decomposition catalyst layer 2002 is provided in the downstream, and then denitration catalyst layer 2003 having $NH_3$ decomposition ability is provided in the further downstream. $NH_3$ in an amount not less than the reaction equivalence for the NOx is added to the upstream to accomplish 90% or more of the denitration reaction in the upstream denitration catalyst layer. Then $NH_3$ is decomposed by $NH_3$ decomposition catalyst layer 2002 to adjust the concentrations of NOx and $NH_3$ at the inlet of the downstream denitration catalyst layer 2003 having $NH_3$ decomposition ability, whereby reducing the concentrations of NOx and $NH_3$ at the final outlet to the levels not exceeding 0.1 ppm and 3 ppm, respectively.

The upstream denitration catalyst employed $TiO_2$ catalysts having V, W or Mo as an active component and supported 4.5% by weight of $V_2O_5$, while the downstream denitration catalyst having $NH_3$ decomposition ability supported $V_2O_5$ in an amount greater than that supported by the upstream catalyst, i.e., in an amount of 4.5% by weight or greater, or, contained 0.0001% by weight or more of a noble metal (Pt, Pd, Ru, Rh or Ir).

As a $NH_3$ decomposition catalyst, a catalyst having a crystalline silicate which is represented by the formula as dehydrated:

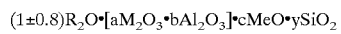

$$(1\pm0.8)R_2O \cdot [aM_2O_3 \cdot bAl_2O_3] \cdot cMeO \cdot ySiO_2$$

wherein R denotes an alkaline metal ion and/or hydrogen ion, M denotes at least one element selected from the group consisting of VIII group elements, rare earth elements, titanium, vanadium, chromium, niobium, antimony and gallium, Me denotes an alkaline earth metal, a+b=1, a≧0, b≧0, c≧0, y/c>1² and y>12, and which has a X-ray diffraction pattern shown in Table 1 shown above as a carrier and at least one metal selected from the group consisting of platinum, palladium, ruthenium and iridium as an active metal may be employed.

It is preferable to control the operation to achieve the concentrations of NOx and $NH_3$ of 0 to 10 ppm and 10 to 30 ppm, respectively, at the outlet of the upstream denitration catalyst layer, and to reduce $NH_3$ in the subsequent $NH_3$ decomposition catalyst layer to achieve the difference between the concentrations of $NH_3$ and NOx at its outlet: 0<$NH_3$ (ppm)–NOx (ppm)<3 ppm. By such denitration method, the concentrations of NOx and $NH_3$ not exceeding 0.1 ppm and 3 ppm, respectively, at the outlet can be achieved.

In the conventional denitration methods employing only denitration catalyst layers, 10 ppm or higher of $NH_3$ emission could not be avoided in order to achieve 0.1 ppm or lower of NOx at the outlet.

Example 2 described below was conducted in relation with the second denitration method referring to FIG. 2.

EXAMPLE 2
(Preparation of denitration catalyst 101)

A powder catalyst consisting of 4% by weight of vanadium pentaoxide ($V_2O_5$) and 8% by weight of tungsten trioxide ($WO_3$) on titanic ($TiO_2$) was molded into a lattice honeycomb having the pitch of 3.3 mm and the wall thickness of 0.5 mm, which was designated as denitration catalyst 101.

(Preparation of $NH_3$ decomposition catalysts 101 to 119)

The 5616 g of water glass #1 ($SiO_2$: 30%) was dissolved in 5429 g of water to yield solution A. Separately, 718.9 g of aluminum sulfate, 110 g of ferric chloride, 47.2 g of calcium acetate, 262 g of sodium chloride and 2020 g of concentrated hydrochloric acid were dissolved together in 4175 g of water to yield solution B. Solution A and solution B were fed in a constant ratio to form a precipitate, and the mixture was stirred thoroughly to yield a slurry at pH 8.0. The slurry thus obtained was charged in a 20 L autoclave, to which 500 g of tetrapropyl ammonium bromide was added and the mixture was subjected to hydrothermal synthesis at 160° C. for 72 hours.

After synthesis, washing with water, drying and sintering for 3 hours at 500° C., crystalline silicate 101 was obtained. Crystalline silicate 101 thus obtained is represented in a molar ratio (excluding crystal water) by the formula shown below and has the crystal structure by X-lay diffraction pattern in Table 1 shown above.

$0.5Na_2O \cdot 0.5H_2O \cdot [0.8Al_2O_3 \cdot O0.2Fe_2O_3O \cdot 0.25CaO] \cdot 25SiO_2$ Crystalline silicate 101 obtained above was subjected to $NH_4$ ion exchange by stirring with 4N aqueous solution of $NH_4Cl$ at 40° C. for 3 hours. After the ion exchange, the silicate was washed and dried at 100° C. for 24 hours and sintered at 400° C. for 3 hours to obtain crystalline silicate 101 of type H (a catalyst which has protons on its surface).

Crystalline silicate 101 of type H thus obtained was impregnated with each of the aqueous solutions of chloroplatinic acid, palladium nitrate, ruthenium chloride, chloroiridic acid and rhodium chloride, evaporated to dryness and sintered at 500° C. for 3 hours to obtain a powder catalyst.

To 100 g of the powder obtained, 3 g of alumina sol and 55 g of silica sol ($SiO_2$: 20% by weight) as binders and 200 g of water were added to obtain a slurry, which was wash-coated to a monolith support for coagulate (30-cells/square inch in a form of lattice) at the coating rate of 200 g/m. The catalysts thus obtained were designated as $NH_3$ decomposition catalysts 101 to 105.

Except for adding cobalt chloride, ruthenium chloride, rhodium chloride, lanthanum chloride, cerium chloride, titanium chloride, vanadium chloride, chromium chloride, antimony chloride, gallium chloride and niobium chloride in the molar amount as an oxide equal to that of $Fe_2O_3$ instead of ferric chloride used in the synthesis of crystalline silicate 101 in the preparation of $NH_3$ decomposition catalysts 101 to 105 described above, the procedure similar to that employed for crystalline silicate 101 was conducted to obtain crystalline silicates 102 to 112. The crystal structures of these crystalline silicates as X-ray diffraction patterns were shown above in Table 1, with the compositions being represented by the following formula in molar ratios of the oxides (dehydrated form): $0.5Na_2O \cdot 0.5H_2O \cdot (0.2M_2O_3 \cdot 0.8Al_2O_3 \cdot 0.25CaO) \cdot 25SiO_2$, wherein M denotes Co, Ru, Rh, La, Ce, Ti, V, Cr, Sb, Ga or Nb.

Then, except for adding magnesium acetate, strontium acetate and barium acetate each in the molar amount as an oxide equal to that of CaO instead of calcium acetate used in the synthesis of crystalline silicate 101, the procedure similar to that employed for crystalline silicate 101 was conducted to obtain crystalline silicates 113 to 115. The crystal structures of these crystalline silicates as X-ray diffraction patterns were shown above in Table 1, with the compositions being represented by the following formula in molar ratios of the oxides (dehydrated form): $0.5Na_2O \cdot 0.5H_2O \cdot (0.2Fe_2O_3 \cdot 0.8Al_2O_3 \cdot 0.25MeO) \cdot 25SiO_2$, where Me denotes Mg, Sr or Ba.

Using crystalline silicates 102 to 115 obtained above and the procedure similar to that for crystalline silicate 101 (the procedure described above), crystalline silicates 102 to 115 of type H were obtained. These crystalline silicates of type H were impregnated with the aqueous solution of chloroplatinic acid, evaporated to dryness and sintered at 500° C. for 3 hours to obtain powder catalysts containing 0.02% by weight of Pt. These powder catalysts were coated to a monolith support for coagulate similarly as for decomposition catalysts 101 to 105, whereby obtaining $NH_3$ decomposition catalysts 106 to 119. The characteristics of $NH_3$ decomposition catalysts 101 to 119 are shown in Table 6 below.

TABLE 6

| $NH_3$ decomposition catalyst No. | Wt % Active metal (value in bracket: amount supported) | Type H crystalline silicate | |
|---|---|---|---|
| | | No. | Composition |
| 101 | Pt (0.02) | 101 | $H_2O.(0.8\ Al_2O_3.0.2\ Fe_2O_3.0.25\ CaO).25\ SiO_2$ |
| 102 | Pd (1) | 101 | $H_2O.(0.8\ Al_2O_3.0.2\ Fe_2O_3.0.25\ CaO).25\ SiO_2$ |
| 103 | Ru (0.3) | 101 | $H_2O.(0.8\ Al_2O_3.0.2\ Fe_2O_3.0.25\ CaO).25\ SiO_2$ |
| 104 | Ir (0.5) | 101 | $H_2O.(0.8\ Al_2O_3.0.2\ Fe_2O_3.0.25\ CaO).25\ SiO_2$ |
| 105 | Rh (0.1) | 101 | $H_2O.(0.8\ Al_2O_3.0.2\ Fe_2O_3.0.25\ CaO).25\ SiO_2$ |
| 106 | Pt (0.02) | 102 | $H_2O.(0.8\ Al_2O_3.0.2\ Co_2O_3.0.25\ CaO).25\ SiO_2$ |
| 107 | Pt (0.02) | 103 | $H_2O.(0.8\ Al_2O_3.0.2\ Ru_2O_3.0.25\ CaO).25\ SiO_2$ |
| 108 | Pt (0.02) | 104 | $H_2O.(0.8\ Al_2O_3.0.2\ Rh_2O_3.0.25\ CaO).25\ SiO_2$ |

TABLE 6-continued

| $NH_3$ decomposition catalyst No. | Wt % Active metal (value in bracket: amount supported) | Type H crystalline silicate No. | Composition |
|---|---|---|---|
| 109 | Pt (0.02) | 105 | $H_2O.(0.8\ Al_2O_3.0.2\ La_2O_3.0.25\ CaO).25\ SiO_2$ |
| 110 | Pt (0.02) | 106 | $H_2O.(0.8\ Al_2O_3.0.2\ Ce_2O_3.0.25\ CaO).25\ SiO_2$ |
| 111 | Pt (0.02) | 107 | $H_2O.(0.8\ Al_2O_3.0.2\ Ti_2O_3.0.25\ CaO).25\ SiO_2$ |
| 112 | Pt (0.02) | 108 | $H_2O.(0.8\ Al_2O_3.0.2\ V_2O_3.0.25\ CaO).25\ SiO_2$ |
| 113 | Pt (0.02) | 109 | $H_2O.(0.8\ Al_2O_3.0.2\ Cr_2O_3.0.25\ CaO).25\ SiO_2$ |
| 114 | Pt (0.02) | 110 | $H_2O.(0.8\ Al_2O_3.0.2\ Sb_2O_3.0.25\ CaO).25\ SiO_2$ |
| 115 | Pt (0.02) | 111 | $H_2O.(0.8\ Al_2O_3.0.2\ Ga_2O_3.0.25\ CaO).25\ SiO_2$ |
| 116 | Pt (0.02) | 112 | $H_2O.(0.8\ Al_2O_3.0.2\ Nb_2O_3.0.25\ CaO).25\ SiO_2$ |
| 117 | Pt (0.02) | 113 | $H_2O.(0.8\ Al_2O_3.0.2\ Fe_2O_3.0.25\ MgO).25\ SiO_2$ |
| 118 | Pt (0.02) | 114 | $H_2O.(0.8\ Al_2O_3.0.2\ Fe_2O_3.0.25\ SrO).25\ SiO_2$ |
| 119 | Pt (0.02) | 115 | $H_2O.(0.8\ Al_2O_3.0.2\ Fe_2O_3.0.25\ BaO).25\ SiO_2$ |

(Preparation of denitration catalysts 201 to 203 having $NH_3$ decomposition ability)

A powder catalyst consisting of 6% by weight of vanadium pentaoxide ($V_2O_5$) and 9% by weight of tungsten trioxide ($WO_3$) on titanic ($TiO_2$) was molded into a lattice honeycomb having the pitch of 3.3 mm and the wall thickness of 0.5 mm, which was designated as denitration catalyst 201 having $NH_3$ decomposition ability.

A powder catalyst supporting 9% by weight of molybdenum trioxide ($MoO_3$) instead of tungsten trioxide ($WO_3$) employed in the preparation of denitration catalyst 201 having $NH_3$ decomposition ability described above was prepared by the method similar to that described above to obtain denitration catalyst 202 having $NH_3$ decomposition ability.

Furthermore, a powder catalyst supporting 3% by weight of vanadium pentaoxide and 0.001% by weight of platinum instead of 6% by weight of vanadium pentaoxide ($V_2O_5$) employed in the preparation of denitration catalyst 201 having $NH_3$ decomposition ability described above was prepared by the method similar to that described above to obtain denitration catalyst 203 having $NH_3$ decomposition ability. (Denitration reaction test: Test No.2-1) Three denitration catalysts 101 having the size of 40 mm×50 mm×400 mmL, 1 $NH_3$ decomposition catalyst 101 having the size of 42 mm×50 mm×150 mmL and 2 denitration catalysts 201 having $NH_3$ decomposition ability which had the size of 40 mm×50 mm×400 mmL were all attached serially and subjected as system 301 to the denitration reaction test in the condition indicated in Table 7 shown below.

TABLE 7

| Exhaust gas composition | Gas amount | Temperature |
|---|---|---|
| Inlet NO: 50 ppm | 22 $Nm^3/h$ | 360° C. |
| Inlet $NH_3$: 60 ppm, 80 ppm | | |
| Inlet $O_2$: 14.7% | | |
| Inlet $H_2O$: 6% | | |

(Denitration reaction test: Test No.2-2)

Systems 302 to 319 were obtained by providing $NH_3$ decomposition catalysts 102 to 119 instead of $NH_3$ decomposition catalyst 1 employed in Test No.2-1, and subjected to the denitration reaction test in the condition similar to that in Test No.2-1.

(Denitration reaction test: Test No.2-3)

Systems 320 and 321 were obtained by providing denitration catalysts 202 and 203 having $NH_3$ decomposition ability instead of denitration catalyst 201 having $NH_3$ decomposition ability employed in Test No.2-1, and subjected to the denitration reaction test in the condition similar to that in Test No.2-1. The results of the tests of systems 301 to 321 are shown in Table 8.

(Comparative denitration reaction test No.1)

In a comparative test, system 322 was obtained by providing only denitration catalyst 101 employed in Test No.2-1 and subjected to the denitration performance test similarly as in Test No.2-1.

In addition, system 323 was obtained by providing only denitration catalyst 101 and $NH_3$ decomposition catalyst 101 employed in Test No.2-1 and subjected to the denitration performance test similarly as in Test No.2-1.

Furthermore, system 324 was obtained by providing two denitration catalysts 101 identical to the first layer in Test No.2-1 instead of denitration catalyst 201 having $NH_3$ decomposition ability provided as the third layer in Test No.2-1, and subjected to the denitration performance test similarly as in Test No.2-1. The results of the tests of systems 322 to 324 are shown also in Table 8.

As evident from the results shown in Table 8, systems 301 to 321 according to the method of the present invention achieved a concentration of NOx at the outlet of the third catalyst layer of 0.02 to 0.04 ppm, indicating a very high denitration efficiency, while reducing the leak of $NH_3$ to a level as low as 0.7 to 2.3 ppm.

On the other hand, system 322 corresponding to a conventional denitration method involved the problem of the $NH_3$ emission as high as 10 to 30 ppm although it achieved a NOx level of 0.02 to 0.03 ppm, as shown in Comparative test No.1.

System 323 wherein only $NH_3$ decomposition catalyst was provided as the second layer provided the concentrations of NOx and $NH_3$ ranging from 0.7 to 1.6 ppm and 2.4 to 7.8 ppm, respectively, which did not indicate a high denitration efficiency and were not NOx emission level corresponding to an atmospheric level. Furthermore, system 324 wherein the denitration catalyst having no $NH_3$ decomposition ability identical to the first layer was provided as the third layer provided the NOx level at the outlet ranging from 0.02 to 0.03 ppm, but it provided a $NH_3$ level at the outlet ranging from 1.5 to 6.2 ppm, indicating that it involved the disadvantage of the leak of $NH_3$ exceeding 5 ppm in case of the $NH_3$ level at the inlet as high as 80 ppm.

TABLE 8

| Test No. | System No. | (First step) Denitration catalyst No. | (Second step) NH₃ decomposition catalyst No. | (Third step) Denitration catalyst having NH₃ decomposition ability No. | Inlet NH₃ (ppm) | Third step catalyst layer outlet NOₓ (ppm) | Third step catalyst layer outlet NH₃ (ppm) |
|---|---|---|---|---|---|---|---|
| 2-1 | 301 | 101 | 101 | 201 | 60 | 0.02 | 0.7 |
|  |  |  |  |  | 80 | 0.02 | 2.1 |
| 2-2 | 302 | " | 102 | " | 60 | 0.03 | 0.8 |
|  |  |  |  |  | 80 | 0.03 | 1.9 |
| " | 303 | " | 103 | " | 60 | 0.02 | 0.9 |
|  |  |  |  |  | 80 | 0.02 | 2.2 |
| " | 304 | " | 104 | " | 60 | 0.03 | 1.0 |
|  |  |  |  |  | 80 | 0.03 | 1.9 |
| " | 305 | " | 105 | " | 60 | 0.03 | 1.1 |
|  |  |  |  |  | 80 | 0.03 | 2.0 |
| " | 306 | " | 106 | " | 60 | 0.03 | 0.9 |
|  |  |  |  |  | 80 | 0.02 | 1.8 |
| " | 307 | " | 107 | " | 60 | 0.03 | 1.0 |
|  |  |  |  |  | 80 | 0.02 | 1.7 |
| " | 308 | " | 108 | " | 60 | 0.02 | 0.9 |
|  |  |  |  |  | 80 | 0.04 | 1.8 |
| " | 309 | " | 109 | " | 60 | 0.03 | 1.0 |
|  |  |  |  |  | 80 | 0.04 | 1.8 |
| " | 310 | " | 110 | " | 60 | 0.03 | 1.0 |
|  |  |  |  |  | 80 | 0.04 | 1.7 |
| " | 311 | " | 111 | " | 60 | 0.03 | 0.9 |
|  |  |  |  |  | 80 | 0.03 | 1.9 |
| " | 312 | " | 112 | " | 60 | 0.03 | 1.0 |
|  |  |  |  |  | 80 | 0.04 | 2.0 |
| 2-2 | 313 | 101 | 13 | 201 | 60 | 0.03 | 1.0 |
|  |  |  |  |  | 80 | 0.02 | 2.1 |
| " | 314 | " | 14 | " | 60 | 0.02 | 1.1 |
|  |  |  |  |  | 80 | 0.02 | 1.9 |
| " | 315 | " | 15 | " | 60 | 0.04 | 1.2 |
|  |  |  |  |  | 80 | 0.02 | 2.1 |
| " | 316 | " | 16 | " | 60 | 0.04 | 1.1 |
|  |  |  |  |  | 80 | 0.03 | 2.0 |
| " | 317 | " | 17 | " | 60 | 0.03 | 1.0 |
|  |  |  |  |  | 80 | 0.03 | 1.9 |
| " | 318 | " | 18 | " | 60 | 0.03 | 0.9 |
|  |  |  |  |  | 80 | 0.04 | 2.0 |
| " | 319 | " | 19 | " | 60 | 0.03 | 1.0 |
|  |  |  |  |  | 80 | 0.03 | 1.9 |
| 2-3 | 320 | " | 1 | 202 | 60 | 0.03 | 0.8 |
|  |  |  |  |  | 80 | 0.02 | 2.2 |
| " | 321 | " | 1 | 203 | 60 | 0.03 | 0.7 |
|  |  |  |  |  | 80 | 0.03 | 2.3 |
| 1 | 322 | 101 | — | — | 60 | 0.02 | 10.1 |
|  |  |  |  |  | 80 | 0.03 | 29.7 |
| " | 323 | 101 | 101 | — | 60 | 0.7 | 2.4 |
|  |  |  |  |  | 80 | 1.6 | 7.8 |
| " | 324 | 101 | 101 | Denitration catalyst similar to that in 1st step 101 | 60 | 0.02 | 1.5 |
|  |  |  |  |  | 80 | 0.03 | 6.2 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of denitrating an exhaust gas containing nitrogen oxides by means of catalytically removing said nitrogen oxides using ammonia as a reducing agent while introducing said exhaust gas into a reaction vessel packed with a catalyst, comprising:

passing said exhaust gas catalyst through a) a first denitration catalyst layer in the upstream of the gas flow under conditions effective to reduce said nitrogen oxides, then b) through an ammonia decomposition catalyst layer containing an ammonia decomposition catalyst under conditions effective to decompose ammonia into nitrogen and nitrogen oxides and then c) through a second denitration catalyst layer downstream from the second layer, wherein ammonia is added in an amount not less than the stoichiometric equivalent of the nitrogen oxides in the exhaust gas at the inlet of the first denitration catalyst layer, and wherein the ammonia decomposition catalyst is a catalyst having a performance of 70% or higher as % nitrogen selection defined as follows:

% nitrogen selection=[1−(NOx (ppm) at outlet of ammonia decomposition catalyst−NOx (ppm) at inlet of ammonia decomposition catalyst/NH₃ (ppm) at inlet of ammonia decomposition catalyst−NH₃ (ppm) at outlet of ammonia decomposition catalyst)]×100.

2. A method of denitrating an exhaust gas according to claim 1, wherein the ammonia decomposition catalyst is one comprising a crystalline silicate of the formula as dehydrated:

$$(1.0\pm0.8)R_2O\cdot[aM_2O_3\cdot bAl_2O_3]\cdot cMeO\cdot ySiO_2$$

wherein R denotes an alkali metal ion and/or hydrogen ion, M denotes at least one element selected from the group consisting of VIII group elements, rare earth elements, titanium, vanadium, chromium, niobium, antimony and gallium, Me denotes an alkaline earth metal, a+b=1, a≧0, b≧0, c=0, and y>12, and which has a X-ray diffraction pattern shown in Table 1 in the specification as a carrier and at least one metal selected from the group consisting of platinum, palladium, ruthenium, iridium, and rhodium as an active metal.

3. A method of denitrating an exhaust gas containing nitrogen oxides by catalytically removing said nitrogen oxides using ammonia as a reducing agent while introducing said exhaust gas containing the nitrogen oxides into a reaction vessel packed with a catalyst, comprising:

passing said exhaust gas catalyst through a) a first denitration catalyst layer in the upstream of the gas flow under conditions effective to reduce said nitrogen oxides, then b) through an ammonia decomposition catalyst layer containing an ammonia decomposition catalyst under conditions effective to decompose ammonia into nitrogen and nitrogen oxides and then c) through a second denitration catalyst layer capable of decomposing ammonia downstream from the second layer, wherein ammonia is added in an amount not less than the stoichiometric equivalent of the nitrogen oxides in the exhaust gas thereby removing the nitrogen oxides contained in said gas, and wherein the ammonia decomposition catalyst is a catalyst having a performance of 70% or higher as % nitrogen selection defined as follows:

% nitrogen selection=[1−(NOx (ppm) at outlet of ammonia decomposition catalyst−NOx (ppm) at inlet of ammonia decomposition catalyst/NH₃ (ppm) at inlet of ammonia decomposition catalyst NH₃ (ppm) at outlet of ammonia decomposition catalyst)]×100.

4. A method of denitrating an exhaust gas according to claim 3, wherein the ammonia decomposition catalyst is one comprising a crystalline silicate which is represented by the formula as dehydrated:

$$(1.0\pm0.8)R_2O\cdot[aM_2O_3\cdot bAl_2O_3]\cdot cMeO\cdot ySiO_2$$

wherein R denotes an alkali metal ion and/or hydrogen ion, M denotes at least one element selected from the group consisting of VIII group elements, rare earth elements, titanium, vanadium, chromium, niobium, antimony and gallium, Me denotes an alkaline earth metal, a+b=1, a>0, b≧0, c=0, and y>12, and which has a X-ray diffraction pattern shown in Table 1 in the specification as a carrier and at least one metal selected from the group consisting of platinum, palladium, ruthenium, iridium, and rhodium as an active metal.

* * * * *